(12) United States Patent
Asai (10) Patent No.: US 7,801,674 B2
(45) Date of Patent: Sep. 21, 2010

(54) TERMINAL DEVICE, SERVER, SYSTEM AND PROGRAM FOR RETRIEVING LANDMARK NAME

(75) Inventor: Arito Asai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 881 days.

(21) Appl. No.: 11/699,332

(22) Filed: Jan. 30, 2007

(65) Prior Publication Data

US 2007/0179705 A1  Aug. 2, 2007

(30) Foreign Application Priority Data

Jan. 31, 2006  (JP)  ............................. 2006-021806

(51) Int. Cl.
*G06F 17/30* (2006.01)
(52) U.S. Cl. ...................................... 701/200
(58) Field of Classification Search .................. None
See application file for complete search history.

(56) References Cited

U.S. PATENT DOCUMENTS

2004/0114042 A1* 6/2004 Paolini et al. .......... 348/207.99
2004/0189816 A1* 9/2004 Nakazawa et al. ....... 348/211.2
2007/0165968 A1* 7/2007 Terayoko .................... 382/305

FOREIGN PATENT DOCUMENTS

| JP | 2002-373172 | 12/2002 |
|---|---|---|
| JP | 2003-271617 | 9/2003 |
| JP | 2004-357222 | * 12/2004 |
| JP | 2005-107867 | 4/2005 |

* cited by examiner

*Primary Examiner*—Michael J. Zanelli
(74) *Attorney, Agent, or Firm*—McGinn IP Law Group, PLLC (57) ABSTRACT

With a registration function, a terminal device sends shooting-location information and a landmark name to a server. The shooting-location information is obtained from an image file, and the landmark name is inputted by a user. The server registers the received location information and the received landmark name in a database so as to relate them. With a retrieval function, the terminal device sends the shooting-location information to the server. On the basis of the received location information, the server retrieves one or more corresponding landmark names along a high-accuracy retrieval program. The retrieved landmark name is sent to the terminal device.

14 Claims, 11 Drawing Sheets

TERMINAL DEVICE, SERVER, SYSTEM AND PROGRAM FOR RETRIEVING LANDMARK NAME

FIELD OF THE INVENTION

The present invention relates to a terminal device, a server, a system and a program for retrieving a landmark mane from location information based on a database, which is built on the basis of registration performed by users.

BACKGROUND OF THE INVENTION

An electronic camera, a camera-equipped cell-phone and a PDA (Personal Digital Assistance) are recently popularized. In such devices, a taken image is saved as image data and the saved image data is displayed on an LCD or the like so that the taken image is viewed without printing the image. However, by organizing photo prints in an album and so forth, it is possible to efficiently carry out classification and retrieval thereof. In contrast, as to the image data taken by the electronics camera and so forth, there is a problem in that it is troublesome to classify and retrieve the image data.

Further, in recent years, an electronics camera utilizing GPS (Global Positioning System) is also popularized (for instance, a camera-equipped cell-phone having a GPS function). In this kind of the electronic camera, it is possible to store the image data to which location data of a shooting point is added. In this regard, there is a proposed technique in that a so-called landmark name of the shooting point, which is a place name, a building name and so forth, is specified from the location data added to the image data taken by the electronic camera, and the image data is classified every landmark name (see Japanese Patent Laid-Open Publication Nos. 2005-107867 and 2003-271617, for instance).

In album preparing device and method described in the above-noted Publication No. 2005-107867, an area where the image data is taken is extracted on the basis of the stored image data to prepare an album in which the image data is classified into the respective areas.

In an image classification method, an image classification system, a program and a data structure of an image file described in the above-noted Publication No. 2003-271617, GPS data is added to an image file and folders are created in accordance with the GPS data. The image file is stored in the corresponding folder on the basis of the GPS data added to the image file to classify the image files every GPS data.

In the above-noted Publication Nos. 2005-107867 and 2003-271617, however, the GPS function is poor and data of the obtained shooting location (latitude/longitude) has an error. Thus, there arises a problem in that a wrong place name and a wrong facility name are likely to be selected as the landmark name at the detection time of the shooting location. In addition, there arises another problem in that it is impossible to change the classification if the image data is classified into the wrong facility. Further, since a large number of landmarks exist within the country and areas thereof have various sizes and locations, collecting the information thereof needs very immense operation. Moreover, there is other problem in that it takes huge cost for managing the information because the landmarks disappear and newly appear with the years.

SUMMARY OF THE INVENTION

In view of the foregoing, it is a primary object of the present invention to provide a landmark-name retrieval system in which a landmark mane is retrieved from location information based on a database built by users performing new registration and renewal registration of the location information and the landmark name.

It is a second object of the present invention to provide a terminal device and a server for composing the landmark-name retrieval system.

It is a third object of the present invention to provide a high-accuracy retrieving program utilizing the above-mentioned database.

In order to achieve the above and other objects, the terminal device according to the present invention comprises an information acquisition part, a terminal-side communication part, a retrieval request part, a landmark-name input part and a registration request par. The terminal device is connected via communication network to a server provided with a database including location information, which represents a location, and a landmark name corresponding to the location information. The terminal device has an image file including a taken image and shooting-location information representing a shooting location of the taken image. The information acquisition part obtains the shooting-location information from the image file. The terminal-side communication part communicates with the server. The retrieval request part sends a retrieval request of the landmark name to the server via the terminal-side communication part. The server retrieves the landmark name from the database on the basis of the shooting-location information sent from the terminal device. And then the server sends the landmark name to the terminal device. By the landmark-name input part, the landmark name corresponding to the shooting-location information is inputted. The registration request part sends a registration request of the inputted landmark name to the server via the terminal-side communication part. The server registers the landmark name in the database on the basis of the sent shooting-location information and the sent landmark name so as to relate the landmark name to the shooting-location information.

The server comprises a server-side communication part, a retrieval part and a registration part. The server-side communication part communicates with the terminal device. The retrieval part retrieves the landmark name from the database on the basis of the retrieval request received from the terminal device via the server-side communication part. The retrieval part retrieves the landmark name, which corresponds to the shooting-location information sent from the terminal device, and sends the landmark name to the terminal device. The registration part newly registers and updates the shooting-location information and the landmark name, which are received from the terminal device via the server-side communication part, in the database. The landmark name is inputted by the terminal device.

The landmark-name retrieval system comprises the terminal device and the server mentioned above.

The landmark-name retrieval system uses a retrieval program to have the server execute a retrieval process by which the landmark name is retrieved. In the retrieval process, locations represented by all the location information of the identical landmark name are surrounded by a closed curve on the database of the server. The inside of the closed curve is specified as a region of the identical landmark name. The landmark name is retrieved by judging whether or not the location represented by the shooting-location information received form the terminal device resides in the region.

The landmark-name retrieval system may use another retrieval program to have the server execute another retrieval process by which one or more landmark names are retrieved. In this retrieval process, the location information registered in a near distance of the shooting-location information is searched on the database every identical landmark name. Values are obtained by performing predetermined function operation for distances, which extend between the shooting location and the locations represented by the searched location information, every landmark name. A summation of the values is calculated every landmark name. The calculated summations are compared. And then, one or more landmark names are specified in descending order of the compared summations.

The landmark-name retrieval system may use the other retrieval program to have the server execute the other retrieval process by which the landmark name is retrieved. In this retrieval process, a gravity-center position and a standard deviation are calculated on the database from the locations, which are represented by all the location information corresponding to the identical landmark name. A circle, which is formed around the gravity-center position and has a radius of the standard deviation multiplied by a predetermined coefficient, is specified as a region of the landmark name. And then, the landmark name is retrieved by detecting the region, in which the location represented by the shooting-location information received from the terminal device resides, from among a plurality of the regions.

It is preferable that the retrieval program has the server execute an excluding process in which the differential location information representing an extremely separated location is excluded on the database.

By using the terminal device, a user easily registers and updates the location information and the landmark name in the database of the server. Since the database is built in this way, maintenance cost for the retrieval system is considerably reduced in comparison with a case in that an administrator collects the information to build and manage the database. Moreover, since the user can update the database, the information of the database is easily kept in an up-to-date state regardless of passage of years so that quality of the retrieval system is improved.

DESCRIPTION OF THE PREFERRED EMBODIMENTS

Figure 1:
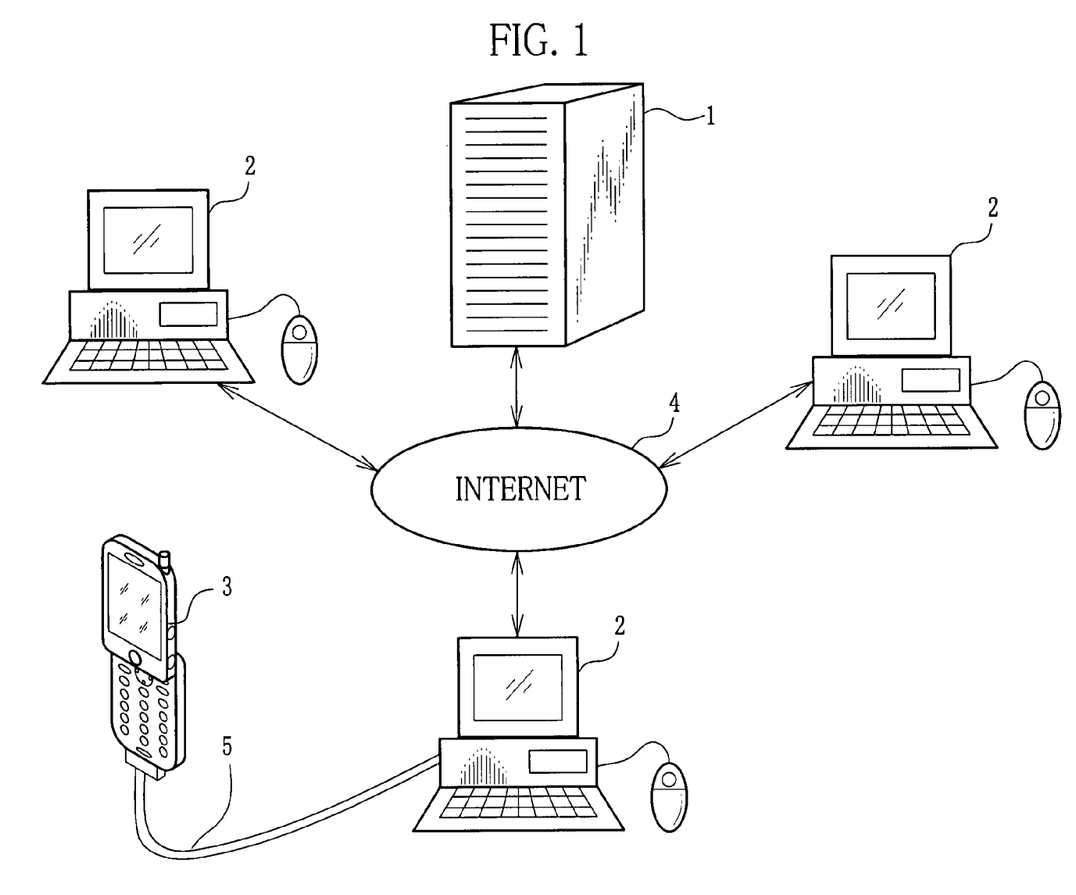
FIG. 1 is a schematic illustration of a network according to the present invention.
Figure 6:
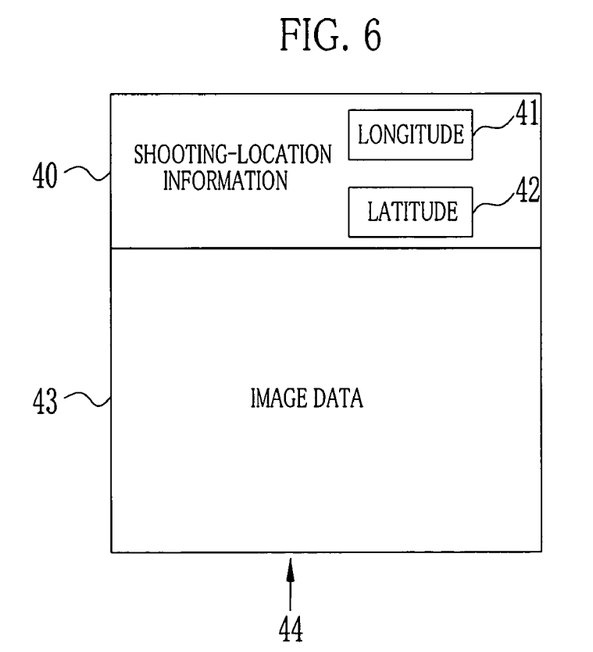
FIG. 6 is an illustration showing a structure of an image file.

FIG. 1 shows a structure of a network according to the present invention. A server 1 is placed in an operating company providing retrieval service. Computers 2 placed in user's homes, offices and so forth are regarded as terminal devices of the server 1. The server 1 and the computer 2 are capable of communicating with each other via the Internet 4. The server 1 possesses a retrieval system described later and communicates with the computers 2 of the users via the Internet 4 so that it is possible to retrieve a landmark name on the basis of location information registered in a database of the server 1. In this regard, a number of the computers 2 communicating with the server 1 may be one or more, and the server 1 is capable of simultaneously communicating with a plurality of the computers 2. Incidentally, the landmark name means a name of a specified facility, a place name and so forth. Meanwhile, it is possible to connect the computer 2 and a camera-equipped cell-phone 3 with an exclusive cable 5 so that the computer 2 is capable of loading an image file. As shown in FIG. 6, the image file 44 comprises image data 43 taken by the equipped camera, and shooting-location information 40 obtained by a built-in GPS function. The shooting-location information 40 includes longitude 41 and latitude 42. The computer 2 is provided with an exclusive viewer (software) for viewing the image data. In virtue of this, location information of the image and the landmark name of the shooting location are adapted to be registered, and the landmark name of the shooting location is adapted to be inversely retrieved from the location information. In this embodiment, the computer 2 is used as the terminal device. However, instead of the computer 2, it is possible to use a cell-phone and a PDA possessing a function for accessing the Internet 4. Moreover, the computer 2 may be mixed with the other terminal devices. Further, in this embodiment, the terminal device uses the exclusive viewer. However, instead of the exclusive viewer, it is possible to use a general-purpose browser of Internet Explorer (registered trademark) and so forth.

Figure 2:
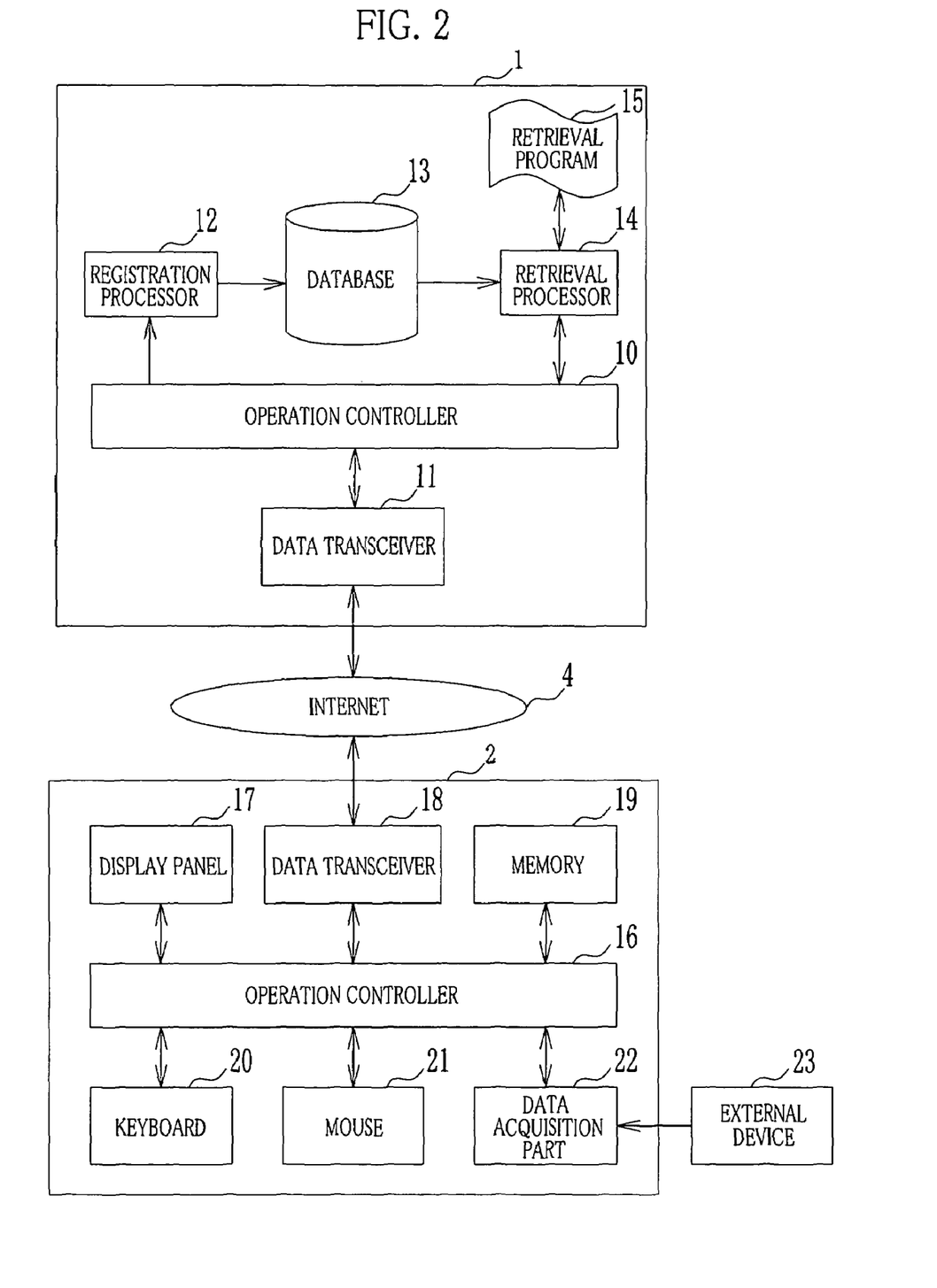
FIG. 2 is a functional block diagram of the present invention.

The server 1 and the computer 2 of this embodiment are described below with reference to FIG. 2. The computer 2 comprises an operation controller 16 for controlling an operation of the above-mentioned exclusive viewer. The computer 2 performs various processes of an image displaying process for a display panel 17, an inputting process for a keyboard 20 and a mouse 21, a reading process for the image file 44 of a data acquisition part 22, a saving process for saving the image data 43 and the shooting-location information 40, which are separated and obtained from the image file 44, in a memory 19, a reading process for reading the image data 43 and the shooting-location information 40 from the memory 19, an outputting process for outputting the shooting-location information 40 and the inputted landmark name to a data transceiver 18, and a receiving process for receiving the retrieved landmark name from a data transceiver 11. The display panel 17 is a general monitor to which a picture of an exclusive viewer is outputted under the control of the operation controller 16. In addition, the image data 43 is reproduced on the display panel 17. The keyboard 20 is used for inputting the landmark name. The mouse 21 is used for selecting an input portion of the picture of the display panel 17 by clicking thereon in inputting the landmark name. Further, the mouse 21 is also used for performing registration and determining an operation of retrieval. The memory 19 stores the image file 44 loaded from an external device 23 of the camera-equipped cell-phone 3 and so forth into the data acquisition part 22. The image file 44 is properly read from the operation controller 16. The memory 19 saves the image data 43 and the shooting-location information 40, which are separated from the image file 44 by the operation controller 16 and are properly read therefrom. The data transceiver 18 is connected to the Internet 4 and performs IP (Internet Protocol) processing. In response to an instruction of the operation controller 16, the shooting-location information 40 and the landmark name, which are inputted by a user through the keyboard 20, are sent to the server 1 as registration request at a time of registration operation. In the meantime, at a time of retrieval operation, the shooting-location information 40 is sent to the server 1 as retrieval request, and the data transceiver 18 receives the landmark name retrieved by the server 1. The retrieved landmark name is outputted to the operation controller 16. Incidentally, when the foregoing cell-phone and PDA are used instead of the computer 2, the equipped LCD is regarded as the display panel and the equipped keys are regarded as the keyboard and the mouse. Further, when the cell-phone and the PDA have a built-in camera, the data acquisition part 22 is unnecessary because it is possible to produce the image file 44 therein.

The server 1 comprises an operation controller 10 for controlling an operation of the above retrieval system. The server 1 performs various processes of an inputting process for the shooting-location information 40 and the landmark name of the data transceiver 11, an inputting process for registration instruction and retrieval instruction based on the registration request and the retrieval request, an outputting process for the retrieved landmark name to the data transceiver 11, a registration instructing process for registering the shooting-location information 40 and the landmark name in a registration processor 12, an outputting process and a retrieval instructing process for the shooting-location information 40 to a retrieval processor 14, and a receiving process for the retrieved landmark name from the retrieval processor 14. The registration processor 12 registers the inputted shooting-location information 40 and the inputted landmark name in a database 13 in response to the registration instruction outputted from the operation controller 10. Meanwhile, the retrieval processor 14 runs a predetermined retrieval program 15 in response to the retrieval instruction of the operation controller 10 to retrieve one or more relevant landmark name from the database 13 on the basis of the inputted shooting-location information 40. The retrieval program 15 is started by a start instruction of the retrieval processor 14 to retrieve at least one landmark name from the shooting-location information 40 along predetermined algorithm described later. The retrieved landmark name is outputted to the retrieval processor 14 as a retrieval result. The database 13 is composed of the location information including the longitude and the latitude, and the landmark name corresponding to the location information. As described above, the database 13 is built by the user performing the registration operation with the computer 2. The data transceiver 11 is connected to the Internet 4 and performs the IP processing. The data transceiver 11 deals with the registration request and the retrieval request, which are sent from the computer 2, to output the registration instruction, the retrieval instruction, the shooting-location information 40 and the landmark name to the operation controller 10. Further, the data transceiver 11 receives the landmark name retrieved by the retrieval processor 14, from the operation controller 10 and sends the received landmark name to the computer 2.

Figure 3:
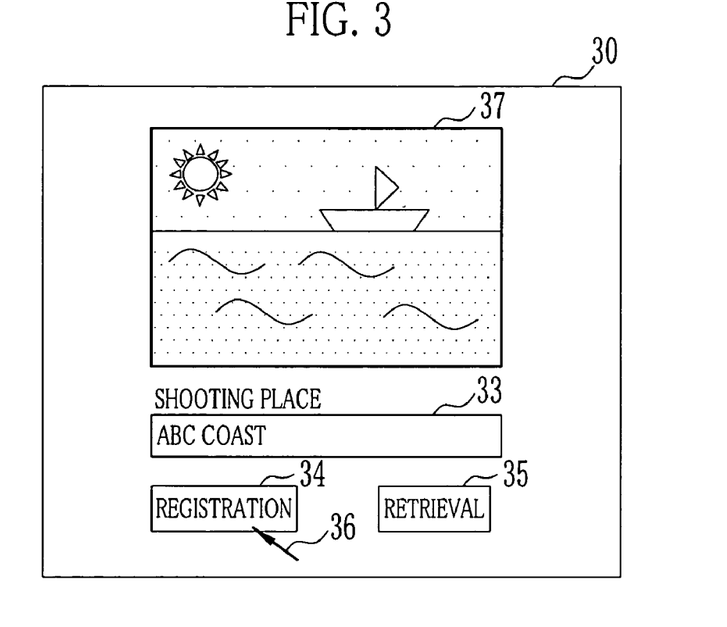
FIG. 3 is an illustration of an image frame shown (at a time of new registration) on a display panel of a terminal device according to the present invention.

Next, an operation performed for the picture shown on the display panel 17 of the computer 2 is described below. First of all, an operation of the registration time is described with reference to FIG. 3. Upon running the above-mentioned exclusive viewer, an operational image frame 30 is displayed. After reading the image file 44, an image is shown within an image display window 37. The user views this image and recalls a shooting place. The shooting-location information 40 is sent to the server 1 such as described above. Actually, the image data 43 of the image file 44 is reproduced in the image frame within which there is a landmark-name input/output part 33 under the words of "SHOOTING PLACE". The mouse 21 is handled to position a pointer 36 at the landmark-name input/output part 33 and clicking of the mouse 21 is performed to set a selectable state. And then, an appropriate landmark name corresponding to the shooting place is inputted with the keyboard 20. In this embodiment, the landmark name of "ABC COAST" to be registered is inputted. After completion of the input, the mouse 21 is handled to position the pointer 36 at a registration button 34 and clicking of the mouse 21 is performed to send the shooting-location information 40 and the inputted landmark name to the server 1 via the Internet 4. In this way, registration to the database 13 is executed.

TABLE 1

| Location Information | | |
|---|---|---|
| Longitude | Latitude | Landmark Name |
| α1(1) | β1(1) | XYZ BEACH |
| α1(2) | β1(2) | XYZ BEACH |
| ... | ... | ... |
| α1(n) | β1(n) | XYZ BEACH |
| α2(1) | β2(1) | D SEA |
| ... | ... | ... |
| α2(m) | β2(m) | D SEA |
| α3(1) | β3(1) | ABC COAST |

Table 1 shows an example of the database of this embodiment. By the above-described registration, "ABC COAST" is registered in the lowest line. Besides this, "XYZ BEACH" and "D SEA" are registered as the landmark name.

Figure 4:
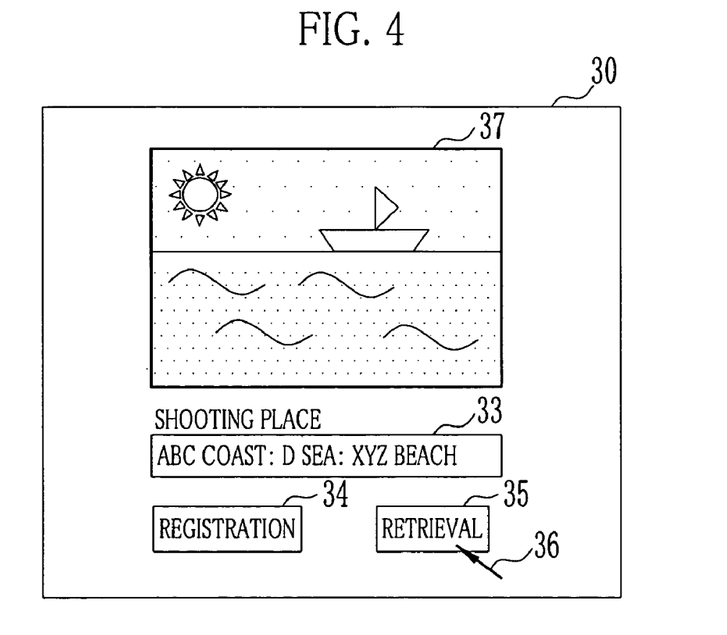
FIG. 4 is an illustration of an image frame shown (at a time of retrieval) on the display panel of the terminal device.

Next, an operation of the retrieval time is described below with reference to FIG. 4. In the state that the exclusive viewer is run and the image file 44 is loaded, the mouse 21 is handled to position the pointer 36 at a retrieval bottom 35 and clicking of the mouse 21 is performed to send the shooting-location information 40 to the server 1 via the Internet 4. And then, retrieval of the landmark name is executed. The retrieved landmark name is received from the server 1 via the Internet 4 and is displayed on the landmark-name input/output part 33. At this time, when there are a plurality of the retrieved landmark names, these names are displayed in one line, interposing a colon (:) such as shown in the drawing. In this embodiment, are displayed "ABC COAST", "D SEA" and "XYZ BEACH" retrieved on the basis of the above Table 1.

Figure 5:
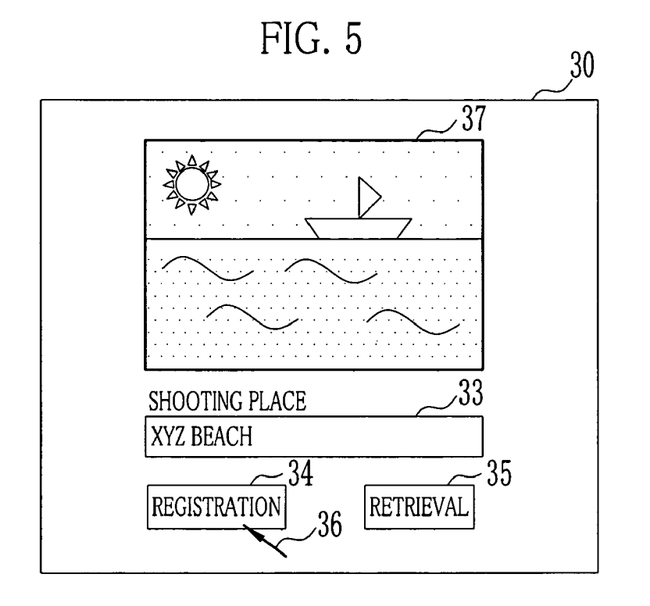
FIG. 5 is an illustration of an image frame shown (at a time of renewal registration) on the display panel of the terminal device.

Next, an operation of the renewal registration time is described below with reference to FIG. 5. When the user tries to register the "XYZ BEACH", which is included in the retrieved landmark names, as the renewed landmark name in the state of the retrieval time shown in FIG. 4, the mouse 21 is handled to position the pointer 36 at the landmark-name input/output part 33 and clicking of the mouse 21 is performed to set a selectable state. And then, all the landmark manes excepting the "XYZ BEACH" are deleted by operating the keyboard 20. After deletion, the mouse 21 is handled to position the pointer 36 at the registration button 34 and clicking of the mouse 21 is performed to send the shooting-location information 40 and the renewed landmark name to the server 1 via the Internet 4. In this way, the renewal registration of the database 13 is executed. By the way, as to the input operation of the landmark name, the selected landmark name may be directly inputted from the keyboard 20.

Figure 7:
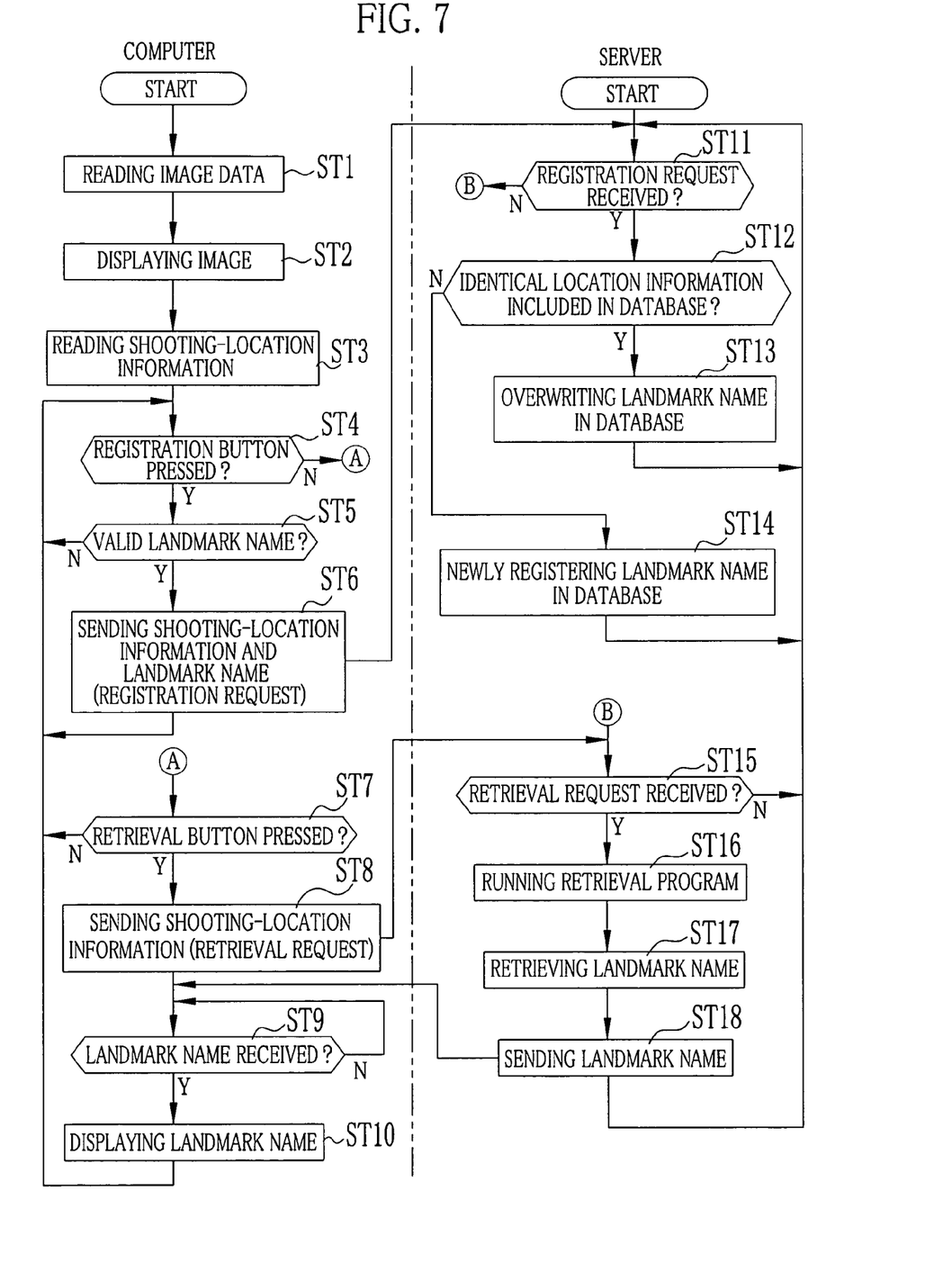
FIG. 7 is a flowchart showing an operation of the terminal device and a server.

A sequence of the operations of the registration and the retrieval is described below with reference to FIG. 7. Upon running the exclusive viewer in the computer 2, the operation controller 16 loads the image data 43 stored in the memory 19 (ST1). And then, the loaded image data 43 is reproduced on the display panel 17 (ST2). Moreover, the operation controller 16 loads the shooting-location information 40 stored in the memory 19 (ST3). Successively, the operation controller 16 judges whether or not the registration button 34 is pressed by the pointer 36 of the mouse 21 (ST4). When pressing of the registration button 34 has been judged, the operation controller 16 further judges whether or not there is a valid letter string in the landmark-name input/output part 33 (ST5). The valid letter string means a letter string in which indicia and so forth usually unused for a name are not included. When it has been judged that the letter string is valid, the valid letter string is regarded as the landmark name and the data transceiver 18 sends this landmark name to the server 1 together with the extracted shooting-location information 40 as the registration request (ST6). When it is judged that the registration button 34 is not pressed and when it is judged that the letter string is not valid, it is judged whether or not the retrieval button 35 is clicked by the pointer 36 of the mouse 21 (ST7).

On the other hand, in the server 1, the operation controller 10 always judges whether or not the registration request has been received from the data transceiver 18 (ST11). Upon reception of the registration request, the database 13 is searched to judge whether or not there is the location information identical with the shooting-location information 40 included in the registration request (ST12). When the identical location information is already registered, the new landmark name is overwritten thereon for updating (ST13). Meanwhile, when the identical location information is not registered, the landmark name is newly registered (ST14).

In the computer 2, when the retrieval button 35 has been pressed, the shooting-location information 40 is sent to the server 1 by the data transceiver 18 as the retrieval request (ST8). In the server 1, similarly to the above-described reception judgment of the registration request, the operation controller 10 always judges whether or not the retrieval request has been received with the data transceiver 11 (ST15). When it has been judged that the retrieval request is received, the retrieval processor 14 runs the retrieval program 15 in response to an instruction of the operation controller 10 (ST16). And then, one or more corresponding landmark manes are retrieved from the database 13 (ST17). The retrieved landmark name is sent to the computer 2 by the data transceiver 11 (ST18).

In the computer 2, the operation controller 16 waits until the data transceiver 18 receives the landmark name retrieved by the server 1 (ST9). Upon reception of the landmark name, the operation controller 16 outputs the received landmark name to the landmark-name input/output part 33 of the image frame such as described above (ST10).

In this way, the user performs the new registration and the renewal registration for the database of the server by using the terminal device so that the cost for maintaining the retrieval system is considerably reduced. Further, since registration contents of the database are kept in an up-to-date state, quality of the retrieval system is improved.

TABLE 2

| Location Information | | |
|---|---|---|
| Longitude | Latitude | Landmark Name |
| $\alpha 1(1)$ | $\beta 1(1)$ | Facility A |
| $\alpha 1(2)$ | $\beta 1(2)$ | Facility A |
| ... | ... | ... |
| $\alpha 1(n)$ | $\beta 1(n)$ | Facility A |
| $\alpha 2(1)$ | $\beta 2(1)$ | Facility B |
| ... | ... | ... |
| $\alpha 2(m)$ | $\beta 2(m)$ | Facility B |
| $\alpha 3(1)$ | $\beta 3(1)$ | Facility C |
| ... | ... | ... |
| $\alpha 3(l)$ | $\beta 3(l)$ | Facility C |
| $\alpha 4(1)$ | $\beta 4(1)$ | Facility D |
| ... | ... | ... |
| $\alpha 4(k)$ | $\beta 4(k)$ | Facility D |
| $\alpha 5(1)$ | $\beta 5(1)$ | Facility E |
| ... | ... | ... |
| $\alpha 5(j)$ | $\beta 5(j)$ | Facility E |

Next, three retrieval methods applicable to the retrieval program 15 are described below. As a matter of convenience for the description, it is assumed that five landmark names of the facilities A, B, C, D, E and the location information corresponding thereto are registered in the database 13 such as shown in the above Table 2.

Figure 8:
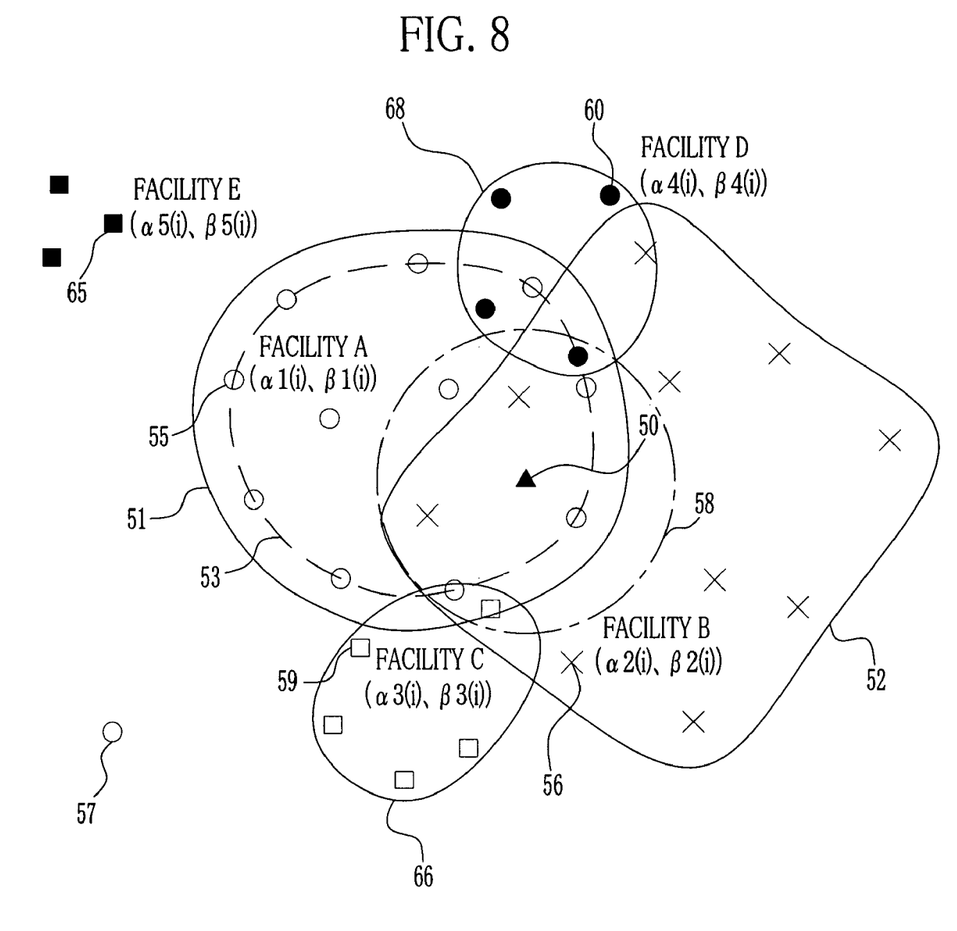
FIG. 8 is a conceptual diagram of a retrieval program (first retrieving method) according to the present invention.
Figure 9:
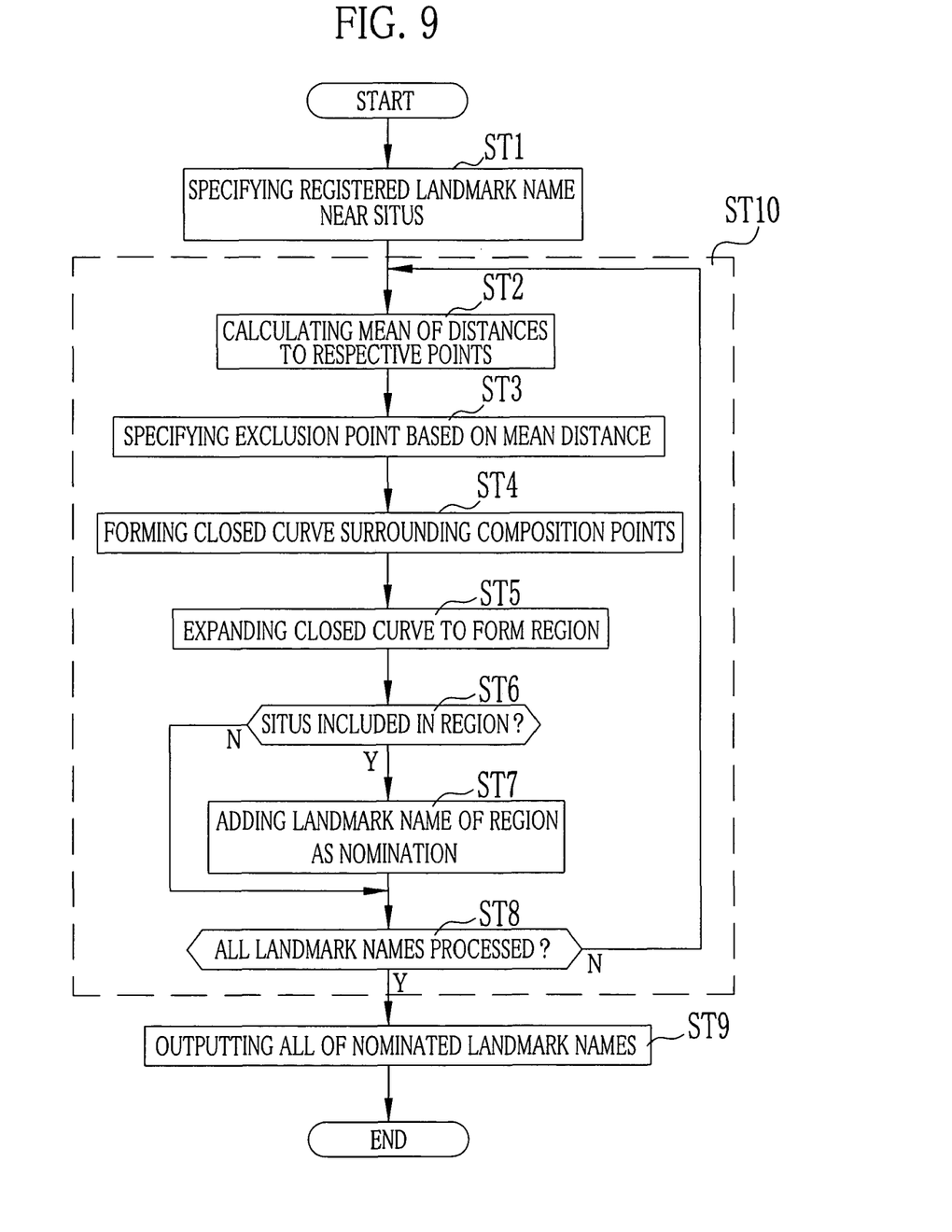
FIG. 9 is a flowchart showing an operation of the retrieval program (first retrieving method)

First of all, with respect to the first retrieval method, a schematic illustration is shown in FIG. 8 and an operation flow is shown in FIG. 9. In FIG. 8, the mark "▲" represents a location 50 of the shooting-location information 40 included in the retrieval request, and the marks "○" represent locations of the location information $(\alpha 1(i), \beta 1(i))$ [i=1 to n] registered as the facility A in Table 2. Moreover, the marks "×" represent locations of the location information $(\alpha 2(i), \beta 2(i))$ [i=1 to m] registered as the facility B in Table 2, and the marks "□" represent locations of the location information $(\alpha 3(i), \beta 3(i))$ [i=1 to l] registered as the facility C in Table 2. Further, the marks "●" represent locations of the location information $(\alpha 4(i), \beta 4(i))$ [i=1 to k] registered as the facility D in Table 2, and the marks "■" represent locations of the location information $(\alpha 5(i), \beta 5(i))$ [i=1 to j] registered as the facility E in Table 2. The marks "○", "×", "□", "●" and "■" are located in a plane as composition points A, B, C, D and E respectively denoted by reference numerals 55, 56, 59, 60 and 65.

A retrieval operation is described below with reference to FIG. 9. At the outset, the landmark name of the location information existing within a neighborhood area 58 is specified as the landmark name to be targeted (ST1). The neighborhood area 58 has a radius of 10 Km around the location 50. The radius, however, is not limited to 10 Km. The radius may be 5 Km and so forth. In FIG. 8, the facilities A, B, C and D are specified and the facility E is not specified. From then, processing is performed for each of the specified landmark manes, and the facilities A, B, C and D are processed one by one in order (ST10). A mean of distances extending from the location 50 to the respective composition points 55 of the facilities A is calculated first (ST2). As to a point satisfying a condition that its distance from the location is more than twice the mean distance, such a point is excluded as an exclusion point 57 so as not to be processed in the succeeding process (ST3). Excluding the point is performed for the purpose of preventing unreliable location information, which is registered in the server 1 by improper input and incorrect input of the user, from causing an error in a result of the retrieval program. In other words, from among the entire location information in which the same landmark name is registered, the location information representing an extremely separated location is excluded. In this embodiment, the condition for excluding the point is that the distance from the location is more than twice the mean distance. However, this magnification ratio is not exclusive. The condition may be that the distance from the location is more than quadruple and so forth of the mean distance.

Successively, a closed curve 53 is formed so as to surround all the composition points 55 excepting the exclusion point 57 (ST4). An area of the closed curve 53 is uniformly expanded by 1.2 times to form an A-region 51 for performing a region specifying process. In this regard, the closed curve is uniformly expanded for the purpose of providing a margin by which an error is prevented. Incidentally, although the area is multiplied by 1.2 times, this is not exclusive. The area may be multiplied by 1.1 times and so forth. In the next step, it is judged whether or not the location 50 is included within the A-region 51 (ST6). When the location 50 is included within the A-region 51, the landmark name is added to the nomination thereof (ST7). When the location 50 is not included within the A-region 51, the landmark name is not added. And then, it is judged whether or not there is the unprocessed landmark name. When there is the unprocessed landmark name, similar processing is subsequently performed for this landmark name (ST8). In other words, with respect to the remaining facilities B, C and D, similar processing is performed to specify a B-region 52, a C-region 66 and a D-region 68. Finally, the facilities A and B are outputted to the retrieval processor 14 as the nominations of the landmark names and the processing is completed (ST9).

Figure 10:
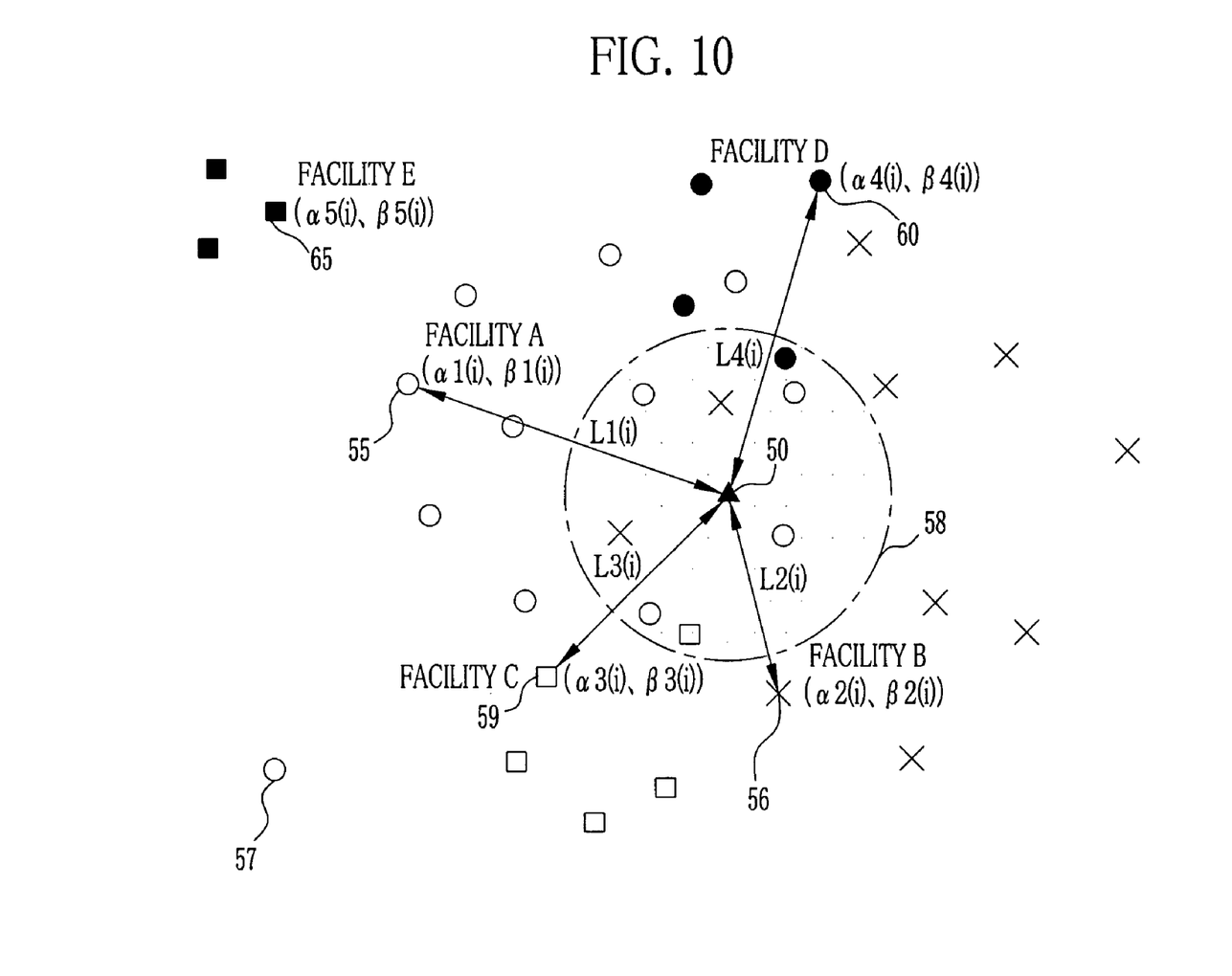
FIG. 10 is a conceptual diagram of another retrieval program (second retrieving method) according to the present invention.
Figure 11:
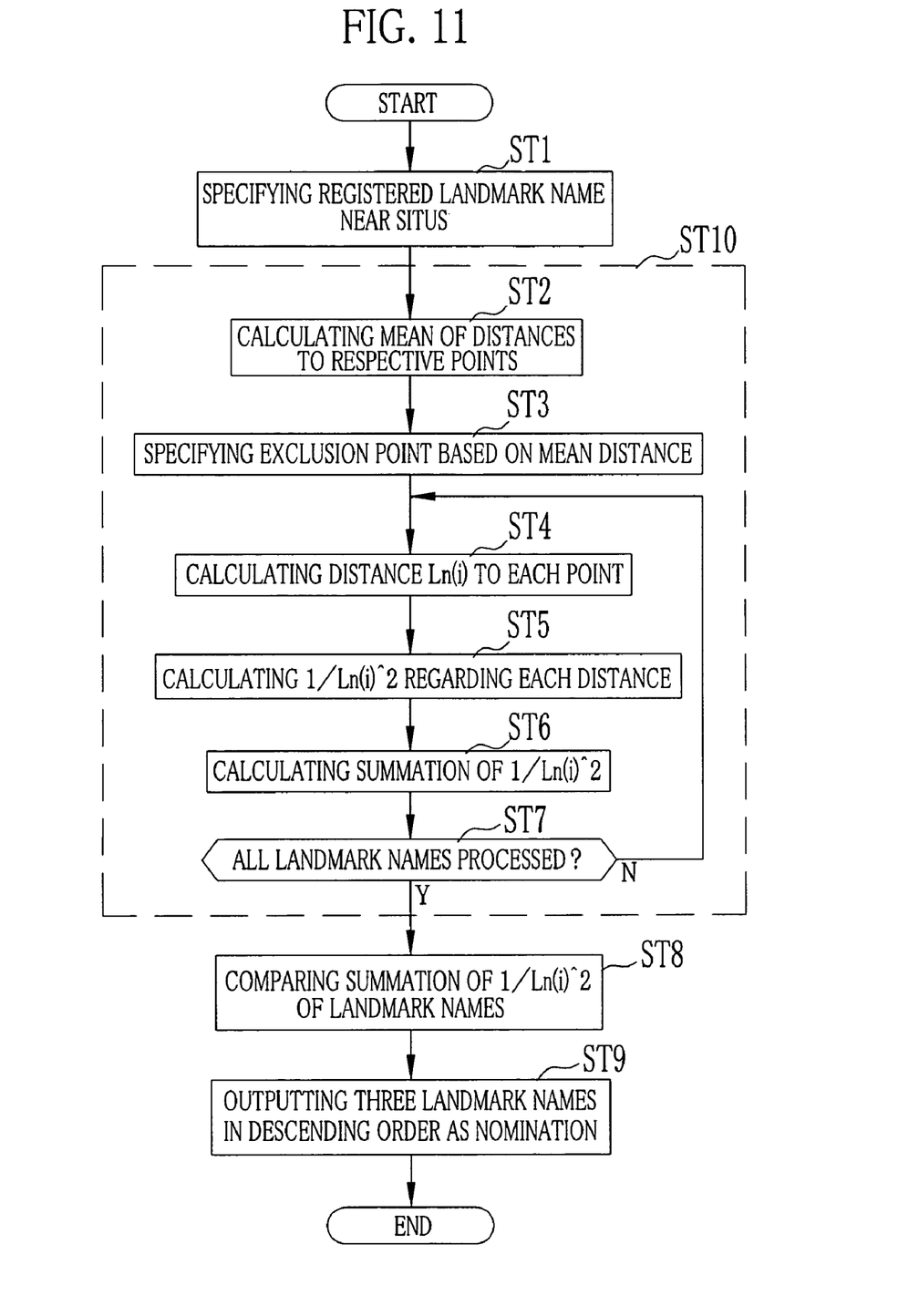
FIG. 11 is a flowchart showing an operation of the retrieval program (second retrieving method)

Next, with respect to the second retrieval method, a schematic illustration is shown in FIG. 10 and an operation flow is shown in FIG. 11. In FIG. 10, contents represented by the marks "▲, ○, ×, □, ●, ■" are identical with FIG. 8, and thus description thereof is abbreviated. The operation flow is described below with reference to FIG. 11. At the outset, the landmark name of the location information existing within the neighborhood area 58 is specified as the landmark name to be targeted (ST1). The neighborhood area 58 has the radius of 10 Km. The radius, however, is not limited to 10 Km and may be 5 Km and so forth. In FIG. 10, the facilities A, B, C and D are specified and the facility E is not specified. From then, processing is performed for each of the specified landmark manes, and the facilities A, B, C and D are processed one by one in order (ST10). Similarly to the first retrieval method, a mean of distances extending from the location 50 to the respective composition points 55 of the facilities A is calculated first (ST2). As to a point satisfying a condition that its distance from the location is more than twice the mean distance, such a point is excluded as the exclusion point 57 so as not to be processed in the succeeding process (ST3). In this embodiment, the condition for excluding the point is that the distance from the location is more than twice the mean distance. However, this is not exclusive. The condition may be that the distance from the location is more than quadruple and so forth of the mean distance.

Successively, L1(i) exceeding from the location 50 to each composition point 55 of the facility A is calculated (ST4), and then $1/L1(i)^2$ is calculated (ST5). Further, with respect to i=1 to n, a summation $SUM1=\Sigma\{1/L1(i)^2\}$ is calculated (ST6). At this point in time, it is judged whether or not there is the unprocessed landmark mane. When there is the unprocessed landmark name, similar operation is continuously performed for this landmark name (ST7). In other words, the remaining facilities B, C and D are similarly processed. Regarding the facility B, a summation $SUM2=\Sigma\{1/L2(i)^2\}$ [i=1 to m] is calculated. Regarding the facility C, a summation $SUM3=\Sigma\{1/L3(i)^2\}$ [i=1 to l] is calculated. Regarding the facility D, a summation $SUM4=\Sigma\{1/L4(i)^2\}$ [i=1 to k] is calculated. Values of the obtained SUM1, SUM2, SUM3 and SUM4 are compared (ST8). After that, three facilities A, B and C are nominated in descending order of the values, and the nominated landmark names are outputted to the retrieval processor 14 to complete the processing (ST9). In this embodiment, three landmark names are nominated in descending order of the values. However, the number of the landmark manes to be nominated is not limited to three, and any number of the landmark manes may be nominated. Moreover, the above-described calculation is not limited to $1/L1(i)^2$. For example, function operation of $1/L1(i)^3$ and so forth may be performed.

Figure 12:
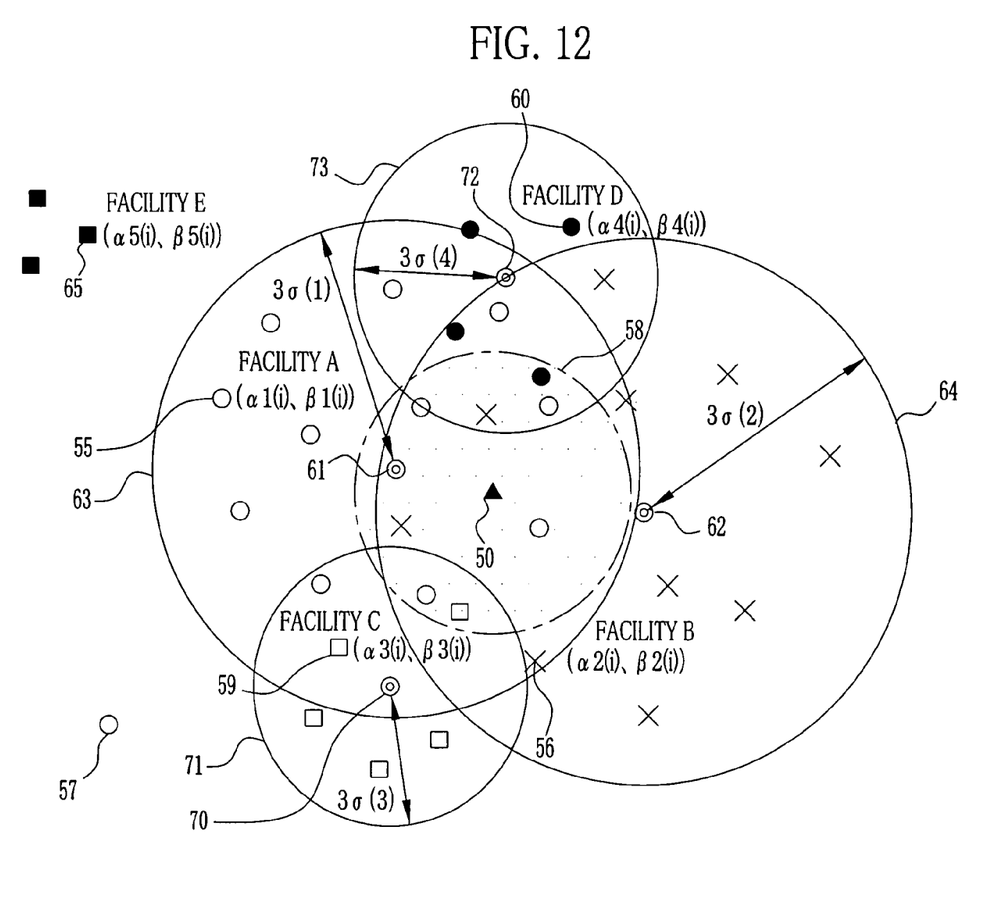
FIG. 12 is a conceptual diagram of the other retrieval program (third retrieving method) according to the present invention.
Figure 13:
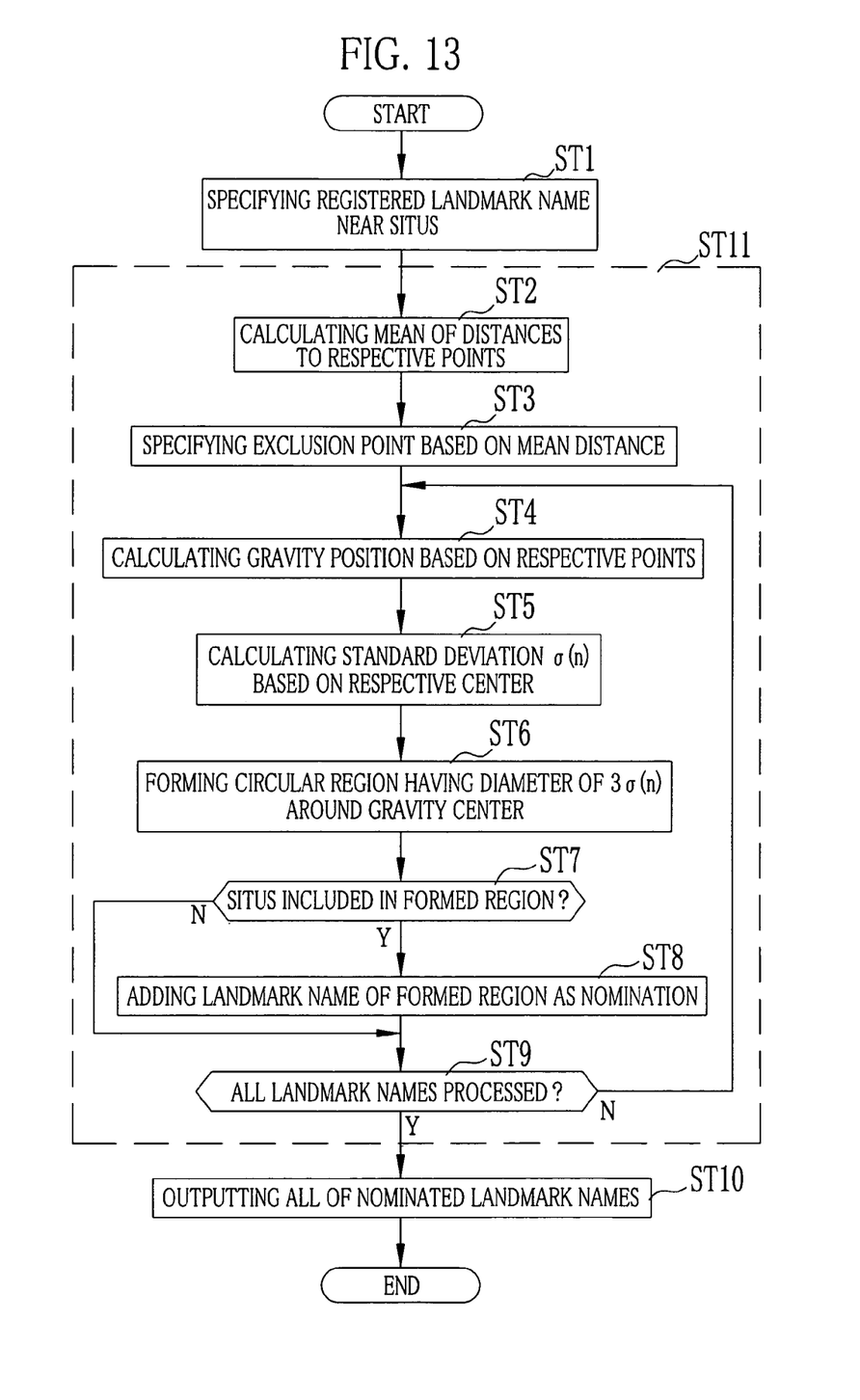
FIG. 13 is a flowchart showing an operation of the retrieval program (third retrieving method).

Next, with respect to the third retrieval method, a schematic illustration is shown in FIG. 12 and an operation flow is shown in FIG. 13. In FIG. 12, contents represented by the marks "▲, ○, ×, □, ●, ■" are identical with FIG. 8, and thus description thereof is abbreviated. The operation flow is described below with reference to FIG. 13. At the outset, the landmark name of the location information existing within the neighborhood area 58 is specified as the landmark name to be targeted (ST1). The neighborhood area 58 has the radius of 10 Km. The radius, however, is not limited to 10 Km and may be 5 Km and so forth. In FIG. 12, the facilities A, B, C and D are specified and the facility E is not specified. From then, processing is performed for each of the specified landmark manes, and the facilities A, B, C and D are processed one by one in order (ST11). Similarly to the first retrieval method, a mean of distances extending from the location 50 to the respective composition points 55 of the facilities A is calculated first (ST2). As to a point satisfying a condition that its distance from the location is more than twice the mean distance, such a point is excluded as the exclusion point 57 so as not to be processed in the succeeding process (ST3). In this embodiment, the condition for excluding the point is that the distance from the location is more than twice the mean distance. However, this is not exclusive. The condition may be that the distance from the location is more than quadruple and so forth of the mean distance.

Successively, with respect to the facilities A, a location of the gravity center 61 of all the composition points 55 is calculated (ST4), and arithmetic processing of standard deviation σ (1) is performed for the whole composition points 55 (ST5). And then, an A-region 63 of the facilities A is set by forming a circle having a radius of 3σ (1) around the gravity center 61 to perform a region specifying process (ST6). Further, it is judged whether or not the location 50 is included within the A-region 63 (ST7). When the location 50 is included within the A-region 63, the landmark name is added to the nomination thereof (ST8). When the location 50 is not included within the A-region 63, the landmark name is not added. At this point in time, it is judged whether or not there is the unprocessed landmark name. When there is the unprocessed landmark name, similar processing is subsequently performed for this landmark name (ST9). In other words, with respect to the remaining facilities B, C and D, similar processing is performed to specify a B-region 64, a C-region 71 and a D-region 73 after calculating locations of gravity centers 62, 70 and 72. Finally, the facilities A and B are outputted to the retrieval processor 14 as the nomination of the landmark names and the processing is completed (ST10). In this embodiment, the respective regions are specified so as to have the radius of 3 σ around each gravity center. However, the radius is not limited to 3σ and σ may be multiplied by any coefficient, such as 5σ and 4.5 σ for instance.

The excluding process for the exclusion point 57, which is performed in the above-described first to third retrieval methods, is unnecessary on condition that the landmark name is not registered in the sever by the incorrect input and the improper input of the location information. Moreover, the excluding process is unnecessary on condition that the registered landmark name is adapted to be corrected by performing the renewal registration even if the landmark name is registered in the sever by the incorrect input and the improper input of the location information. For example, there is a conceivable case in that a user has some valid contract with an operating company providing retrieval service.

By performing the retrieval process such as described above, it is possible to accurately retrieve the corresponding landmark name from the location information. Thus, quality of the retrieval system is improved.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A terminal device connected via communication network to a server provided with a database including location information, which represents a location, and a landmark name corresponding to the location information, said terminal device having an image file including a taken image and shooting-location information representing a shooting location of the taken image, said terminal device comprising:
    an information acquisition part for obtaining said shooting-location information from said image file;
    a terminal-side communication part for communicating with said server;
    a retrieval request part for sending a retrieval request of the landmark name to said server via said terminal-side communication part, said server retrieving the landmark name from said database on the basis of said shooting-location information sent from said terminal device, and then said server sending the landmark name to said terminal device;
    a landmark-name input part for inputting the landmark name corresponding to said shooting-location information; and
    a registration request part for sending a registration request of the inputted landmark name to said server via said terminal-side communication part, said server registering the landmark name in said database on the basis of the sent shooting-location information and the sent landmark name so as to relate the landmark name to said shooting-location information.

2. The terminal device according to claim 1, wherein said shooting-location information includes a longitude and a latitude of said shooting location.

3. The terminal device according to claim 1, wherein said communication network comprises the Internet and said terminal device comprises a computer.

4. The terminal device according to claim 3, wherein said computer is connected to a camera-equipped external device, in which said image file is produced, to load said image file from said external device.

5. The terminal device according to claim 3, further comprising a display panel showing said image of said image file for which said retrieval and registration requests are to be made, the retrieved and inputted landmark names, and buttons used for the retrieval request and the registration request.

6. A server provided with a database including location information and a landmark name corresponding to the location information, said server connecting via a communication network to a terminal device having an image file including a taken image and shooting-location information representing a location of the taken image, said server comprising:
    a server-side communication part for communicating with said terminal device;
    a retrieval part for retrieving the landmark name from said database on the basis of a retrieval request received from said terminal device via said server-side communication part, said retrieval part retrieving the landmark name, which corresponds to the shooting-location information sent from said terminal device, and sending the landmark name to said terminal device; and
    a registration part for newly registering and updating the shooting-location information and the landmark name, which are received from said terminal device via said server-side communication part, in said database, said landmark name being inputted by said terminal device.

7. The server according to claim 6, wherein said communication network comprises the Internet.

8. A landmark-name retrieval system comprising:
    a terminal device according to claim 1; and
    a server provided with a database including location information and a landmark name corresponding to the location information, said server connecting via a communication network to a terminal device having an image file including a taken image and shooting-location information representing a location of the taken image, said server further comprising:
    a server-side communication part for communicating with said terminal device;
    a retrieval part for retrieving the landmark name from said database on the basis of a retrieval request received from said terminal device via said server-side communication part, said retrieval part retrieving the landmark name, which corresponds to the shooting-location information sent from said terminal device, and sending the landmark name to said terminal device; and
    a registration part for newly registering and updating the shooting-location information and the landmark name, which are received from said terminal device via said server-side communication part, in said database, said landmark name being inputted by said terminal device;
    wherein said communication network is the Internet.

9. A retrieval program product for a landmark-name retrieval system comprising a server and at least one terminal device connected thereto via a communication network, said server storing a database including location information, which represents a location, and a landmark name corresponding to said location information, said program product having said server execute:
    surrounding said locations, which are represented by all the location information corresponding to an identical landmark name, on said database with a closed curve;
    specifying the inside of said closed curve as a region of said landmark name; and
    retrieving the landmark name by judging whether or not the location represented by a shooting-location information received from said at least one terminal device resides in said region.

10. The retrieval program product according to claim 9, further having said server execute:

excluding a differential location information, which represents the extremely separated location in comparison with the other location information of all the location information corresponding to the identical landmark name, from the region of said landmark name on said database.

11. A retrieval program product for a landmark-name retrieval system comprising:

a server and at least one terminal device connected thereto via a communication network, said server storing a database including location information, which represents a location, and a landmark name corresponding to said location information, said program product having said server execute:

searching the location information registered in a near distance of shooting-location information, which is received from said terminal device, on said database at every identical landmark name;

calculating a summation of values obtained by performing predetermined function operation for distances, which extend between the locations represented by the searched location information and a shooting location, at every landmark name;

comparing said summations calculated at every landmark name; and specifying one or more landmark names in descending order of the compared summations.

12. The retrieval program product according to claim 11, further having said server execute:

excluding a differential location information, which represents the extremely separated location in comparison with the other location information of all the location information corresponding to the identical landmark name, on said database.

13. A retrieval program product for a landmark-name retrieval system comprising:

a server and at least one terminal device connected thereto via a communication network, said server storing a database including location information, which represents a location, and a landmark name corresponding to said location information, said program having said server execute:

calculating a gravity-center position and a standard deviation from the locations, which are represented by all the location information corresponding to an identical landmark name, on said database;

specifying a circle, which is formed around said gravity-center position and has a radius of said standard deviation multiplied by a predetermined coefficient, as a region of said landmark name; and retrieving the landmark name by detecting the region, in which the location represented by a shooting-location information received from the at least one terminal device resides, from among a plurality of the regions.

14. The retrieval program product according to claim 13, further having said server execute:

excluding a differential location information, which represents the extremely separated location in comparison with the other location information of all the location information corresponding to the identical landmark name, on said database.

* * * * *